United States Patent
Bremer et al.

(10) Patent No.: US 7,916,776 B2
(45) Date of Patent: Mar. 29, 2011

(54) PERFORMANCE CUSTOMIZATION SYSTEM AND PROCESS FOR OPTIMIZING XDSL PERFORMANCE

(75) Inventors: Gordon Bremer, Clearwater, FL (US); Craig Matthews, Tinton Falls, NJ (US)

(73) Assignee: Paradyne Corporation, Largo, FL (US)

( * ) Notice: Subject to any disclaimer, the term of this patent is extended or adjusted under 35 U.S.C. 154(b) by 1024 days.

(21) Appl. No.: 10/689,425

(22) Filed: Oct. 20, 2003

(65) Prior Publication Data

US 2004/0081233 A1 Apr. 29, 2004

Related U.S. Application Data

(63) Continuation of application No. 09/102,176, filed on Jun. 22, 1998, now Pat. No. 6,647,058.

(60) Provisional application No. 60/050,564, filed on Jun. 23, 1997.

(51) Int. Cl.
*H04B 1/38* (2006.01)
*H04B 3/46* (2006.01)
*H04B 17/00* (2006.01)

(52) U.S. Cl. ...... 375/222; 375/225; 375/227; 455/67.13

(58) Field of Classification Search .............. 375/219, 375/222, 225, 227, 377; 370/282; 455/67.13
See application file for complete search history.

(56) References Cited

U.S. PATENT DOCUMENTS

| | | | |
|---|---|---|---|
| 4,679,227 A | 7/1987 | Hughes-Hartogs | |
| 4,731,816 A | 3/1988 | Hughes-Hartogs | |
| 4,833,706 A | 5/1989 | Hughes-Hartogs | |
| 5,008,903 A | 4/1991 | Betts et al. | |
| 5,150,387 A | 9/1992 | Yoshikawa et al. | 375/122 |
| 5,265,151 A * | 11/1993 | Goldstein | 379/93.32 |
| 5,369,703 A * | 11/1994 | Archibald et al. | 380/268 |
| 5,475,711 A | 12/1995 | Betts et al. | |
| 5,671,250 A | 9/1997 | Bremer et al. | 375/222 |
| 5,682,378 A * | 10/1997 | Betts et al. | 370/286 |
| 5,726,765 A | 3/1998 | Yosgida et al. | 358/412 |
| 5,802,446 A | 9/1998 | Giorgi et al. | 455/69 |
| 5,852,633 A | 12/1998 | Levin et al. | 375/260 |
| 5,991,269 A | 11/1999 | Williamson et al. | 370/241 |
| 5,991,329 A | 11/1999 | Lomp et al. | 375/130 |
| 6,061,427 A | 5/2000 | Ryoo | 379/1 |
| 6,094,459 A | 7/2000 | Kao et al. | 375/295 |
| 6,101,223 A | 8/2000 | Betts | 375/261 |
| 6,111,936 A | 8/2000 | Bremer | 379/28 |
| 6,154,524 A | 11/2000 | Bremer | 379/27 |
| 6,215,793 B1 * | 4/2001 | Gultekin et al. | 370/465 |
| 6,278,728 B1 * | 8/2001 | McHale et al. | 375/219 |

OTHER PUBLICATIONS

"Network and Customer Installation Interfaces - Asymmetric Digital Subscriber Line (ADSL) Metallic Interface", American National Standards Institute (ANSI) T1.413, 1995, pp. 1-186.

* cited by examiner

*Primary Examiner* — Young T. Tse
(74) *Attorney, Agent, or Firm* — Thomas, Kayden, Horstemeyer & Risley, LLP

(57) ABSTRACT

A system and process for customizing the performance of an xDSL communication system in which a transmitting modem and/or a receiving modem will negotiate a performance parameter for adjustment.

58 Claims, 5 Drawing Sheets

PERFORMANCE CUSTOMIZATION SYSTEM AND PROCESS FOR OPTIMIZING XDSL PERFORMANCE

CROSS-REFERENCE TO RELATED APPLICATION

This application is a continuation of U.S. utility application entitled, "PERFORMANCE CUSTOMIZATION SYSTEM AND PROCESS FOR OPTIMIZING xDSL PERFORMANCE," having Ser. No. 09/102,176, filed Jun. 22, 1998, now issued as U.S. Pat. No. 6,647,058, which is entirely incorporated herein by reference. Furthermore, this application claims the benefit of U.S. Provisional Application No. 60/050,564, entitled "Power Adaptive xDSL," filed Jun. 23, 1997, which is entirely incorporated herein by reference.

BACKGROUND

With the explosion in the growth of Internet usage among both businesses and households, telephone companies have been pressured to provide affordable, high bandwidth access that will support high-speed multimedia services, such as video on demand, high speed Internet access, and video conferencing. To meet this demand, telephone companies are increasingly turning to DSL technology. DSL, while having several different embodiments, can provide throughput rates over 400 times faster than that available through traditional 14.4 kbps modems. For example, the following manifestations of DSL technology are either available today or are currently being tested on a trial basis: Asymmetric Digital Subscriber Line (ADSL), which has a throughput of 32 kbps to 8.192 Mbps downstream to the customer and 32 kbps to 1.088 Mbps upstream to the network; Rate Adaptive Asymmetric Digital Subscriber Line (RADSL), which is a rate adaptive variation of ADSL; High-bit-rate Digital Subscriber Line (HDSL), which offers full duplex throughput at T1 (1.544 Mbps) or E1 (2.048 Mbps) data rates; Symmetric Digital Subscriber Line (SDSL), which provides bi-directional throughput at data rates ranging from 160 Kbps-2.084 Mbps; and Very high-bit-rate Digital Subscriber Line (VDSL), which provides high data rates for customers close to the central office (e.g., 51 Mbps for subscribers within 1000 feet). But most importantly, xDSL offers these high data rates over a standard copper telephone line. Thus, with such a large, embedded copper network already in place, network operators view xDSL technology as a means for extending the life of their investment in copper by many years.

Inasmuch as xDSL is deployed over the copper network, it is susceptible to the same unwanted noise signals that plague traditional copper based communication systems. Noise can be generated by components both internal to the communication system, such as resistors and solid state devices, and sources external to the communication system, such as atmospheric noise, high-voltage power lines and electric motors.

It is well known from information theory that the capacity of a channel (i.e., maximum data rate) is directly related to the logarithm of the ratio of the signal power to the noise power on the channel. Therefore, to support the high data rates associated with xDSL, it would seem desirable to boost transmission power levels to boost the signal-to-noise ratio. As discussed in the foregoing, however, most xDSL systems operate across a broad range of data rates. Thus, if the transmission power level is statically set to support the highest rate possible, this will result in a waste of power for data sessions running at lower throughputs. Moreover, high transmission power levels unfortunately contribute to a phenomenon known as crosstalk, which is perhaps the most common and troubling source of noise in a network.

Crosstalk is defined as the cross coupling of electromagnetic energy between adjacent copper loops in the same cable bundle or binder. Crosstalk can be categorized in one of two forms: Near end crosstalk, commonly referred to as NEXT, is the most significant because the high energy signal from an adjacent system can induce relatively significant crosstalk into the primary signal. The other form is far end crosstalk or FEXT. FEXT is typically less of an issue because the far end interfering signal is attenuated as it traverses the loop. Crosstalk is a dominant factor in the performance of many systems. As a result, xDSL system performance is often stated relative to "in the presence of other systems" that may introduce crosstalk. Therefore, in central office (CO) environments where many xDSL loops or other circuits are bundled together in the same cable binder, it is often desirable to minimize transmit power levels to the lowest levels possible that will still support the desired data rates to reduce the effects of crosstalk between the loops.

Alternatively, where maximum throughput is sought, it becomes desirable to maintain the transmit power level of a given xDSL communication session thereby allowing the data rate to be maximized within the limitations imposed by the noise characteristics of the channel. Optimization of xDSL performance in a central office environment would typically require a combination of both power reduction on some channels and increased throughput or data rates on other channels.

In addition to crosstalk, there may be other reasons to adapt power levels. One of these is to reduce unwanted noise created by the system itself. Certain impairments on the copper loop, such as bridged taps (an unterminated parallel length of wire) may create reflections and distortion energy that can reduce the overall performance of the system. Reducing the power in a frequency band that creates distortion energy or increasing the power in a band that does not create distortion energy can improve the performance of the overall system.

In view of the foregoing discussion, what is sought is an xDSL system and process that dynamically adjust the transmit power levels, data rates, and other defined performance parameters of one or more specific communication sessions to customize overall system performance.

SUMMARY OF THE INVENTION

Certain advantages and novel features of the invention will be set forth in the description that follows and will become apparent to those skilled in the art upon examination of the following or may be learned with the practice of the invention.

One embodiment is generally directed to a performance customization system and process for optimizing xDSL performance. Broadly stated, an improved receiving modem according to one embodiment includes negotiating means that the receiving modem uses to negotiate with a transmitting modem to select a particular xDSL performance parameter to be optimized. In another embodiment, the receiving modem may include means that are used to calculate the signal-to-noise ratio on the xDSL. Finally, the receiving modem includes means capable of requesting an adjustment in the selected performance parameter.

According to another embodiment, an improved transmitting modem is disclosed that includes negotiating means used to negotiate with a receiving modem to select an xDSL performance parameter to be optimized. The transmitting modem further includes means responsive to performance parameter adjustment requests that are sent from a receiving modem. Further means are included in the transmitting modem for making the requested adjustment to the xDSL performance parameter.

An embodiment can also be viewed as providing a method for customizing the performance characteristics of an xDSL receiving modem. In this regard, the method can be broadly summarized by the following steps: The receiving modem negotiates with a transmitting modem to select an xDSL performance parameter for optimization. A signal-to-noise ratio is calculated and, based on this result, an adjustment request is made for the selected xDSL performance parameter.

Similarly, an embodiment provides a method for customizing the performance characteristics of an xDSL transmitting modem. The method can be broadly summarized as follows: The transmitting modem negotiates with a receiving modem to select an xDSL performance parameter for optimization. An adjustment request for the selected xDSL performance parameter is received and, based on this request, the performance parameter is adjusted.

According to an embodiment, the modems will choose either the data rate or the transmission power level as the performance parameter for adjustment. The non-selected performance parameter is assigned a fixed value while the selected performance parameter will undergo adjustment until the system operates at a data rate that is marginally supported by the transmission power level.

In a multiple xDSL system in which the xDSLs affect each others' performance through crosstalk, another embodiment allows a first modem pair to instigate a transmission power reduction, which will in turn allow a second modem pair to either increase its present data rate or decrease its transmission power. Through this combination of transmission power adaptation and data rate adaptation, it is possible to reduce the performance variance between the individual communication sessions or customize the performance profile according to specific customer requirements.

Additional advantages will become apparent from a consideration of the following description and drawings:

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION

Figure 1:
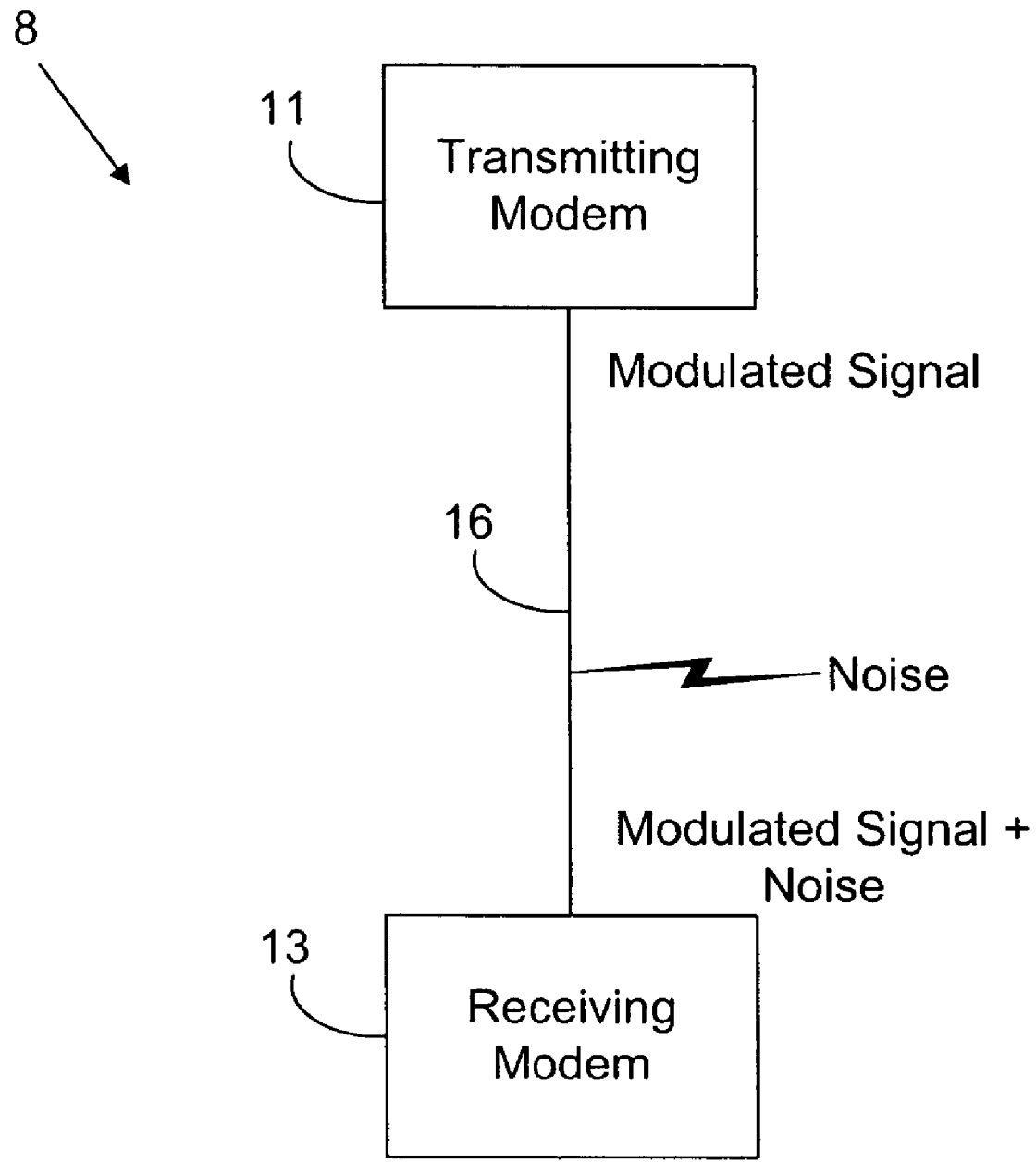
FIG. 1 is a block diagram of a prior art xDSL communication system.

While the invention is susceptible to various modifications and alternative forms, a specific embodiment thereof is shown by way of example in the drawings and will herein be described in detail. It should be understood, however, that there is no intent to limit various embodiments of the invention to the particular form disclosed, but on the contrary, embodiments of the invention cover all modifications, equivalents, and alternatives falling within the spirit and scope of the invention as defined by the claims.

A general model for a prior art xDSL communication system 8 is illustrated in the block diagram of FIG. 1. The system comprises a transmitting modem 11 and a receiving modem 13 that communicate with one another over an xDSL 16. Transmitting modem 11, through the use of a modulator, uses a message signal, generally known as a modulating or baseband signal, to modulate a carrier signal to produce what is commonly referred to as a modulated signal. As in any data transmission event, however, the signal received by a demodulator at receiving modem 13 will consist of the modulated signal, modified by distortions imposed by the transmission system, plus noise that is inserted between transmission and reception.

Noise can be divided into four categories: thermal noise, intermodulation noise, crosstalk and impulse noise. Thermal noise is due to thermal agitation of electrons in a conductor and is a function of temperature. This type of noise is present in all electronic devices and transmission media and is usually referred to as white noise, inasmuch as it is uniformly distributed across the frequency spectrum. A second type of noise, known as intermodulation noise, occurs when signals at different transmission frequencies share the same transmission medium. The effect of intermodulation noise is to produce signals at a frequency that is the sum or difference of two original frequencies. Crosstalk, which was discussed hereinbefore, can be broadly described as the unwanted coupling of signals between signal paths. The last type of noise, impulse noise, is the most unpredictable. Impulse noise consists of irregular pulses or noise spikes of short duration that are typically generated from external electromagnetic sources such as lightning, electric machinery and/or faults and flaws in the communication system.

Measures can be taken to counteract or at least minimize the effects of intermodulation and crosstalk noise, but thermal and impulse noise are ever present in virtually any electronic, copper based communication system. Therefore, for demodulator 20 to demodulate the modulated signal to obtain the original message signal, the ratio of the modulated signal power to the noise signal power must exceed a certain level. Typically, this ratio is referred to as the signal-to-noise (S/N) ratio and is reported in decibels according to EQ. 1 as follows:

$$(S/N)dB = 10\log(\text{signal power/noise power}) \qquad \text{EQ. 1}$$

Moreover, the maximum rate at which data can be transmitted across xDSL 16 is directly related to the logarithm of the ratio of the signal power to the noise power on the channel as expressed in EQ. 2 where the data rate is expressed in bits per second and W represents the bandwidth of the channel in hertz as follows:

$$\text{data rate bps} = W\log 2(1+(\text{signal power/noise power})) \qquad \text{EQ. 2}$$

Nevertheless, simply boosting the transmit power level at transmitting modem 11 to its maximum value to support the high data rates of an xDSL communication session may result in unnecessary power consumption for data sessions running at lower throughputs as discussed hereinbefore. Various embodiments of the present invention overcomes this problem through dynamic adaptation of the transmission power level.

Figure 2:
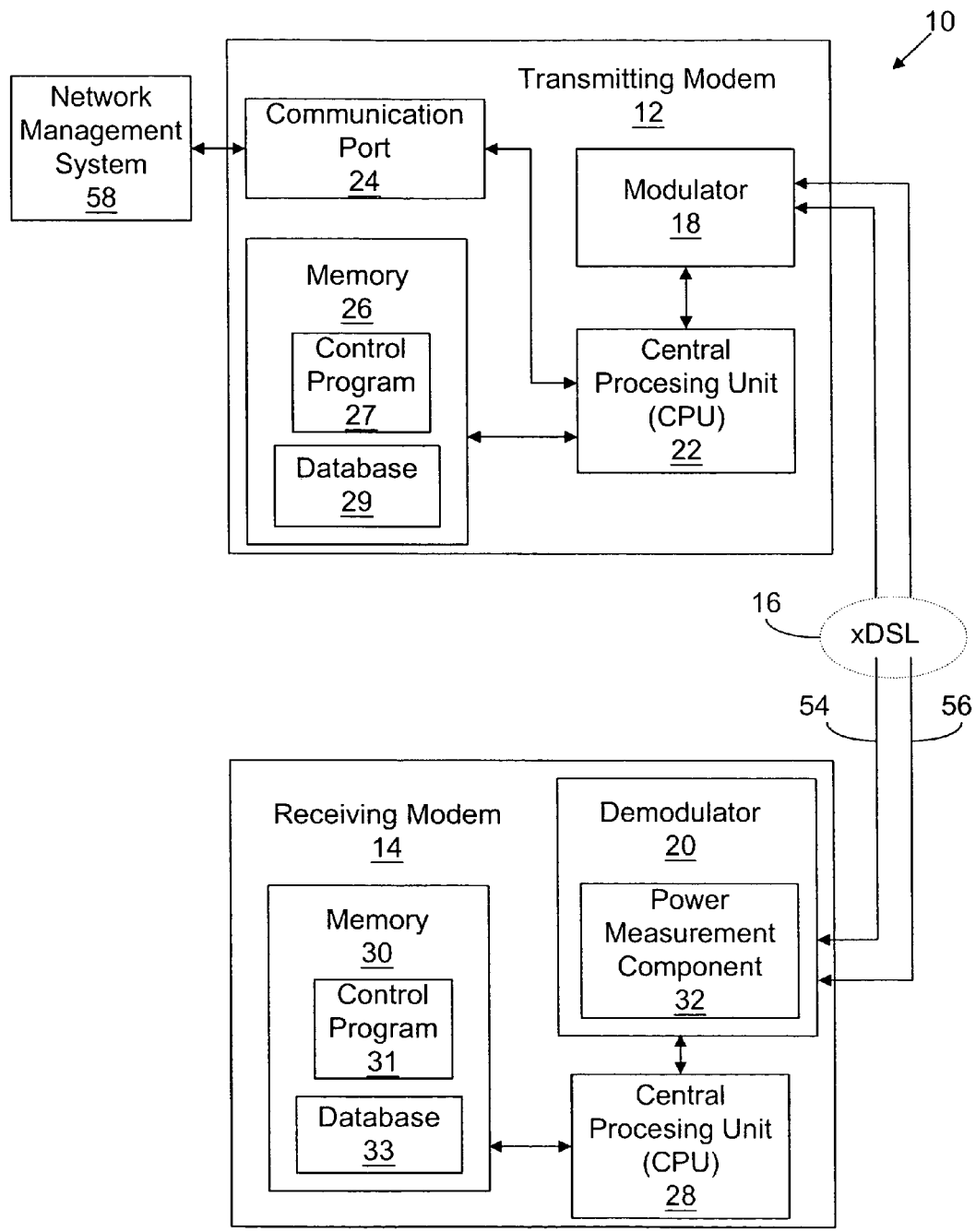
FIG. 2 is a detailed block diagram of the xDSL performance customization system.
Figure 3:
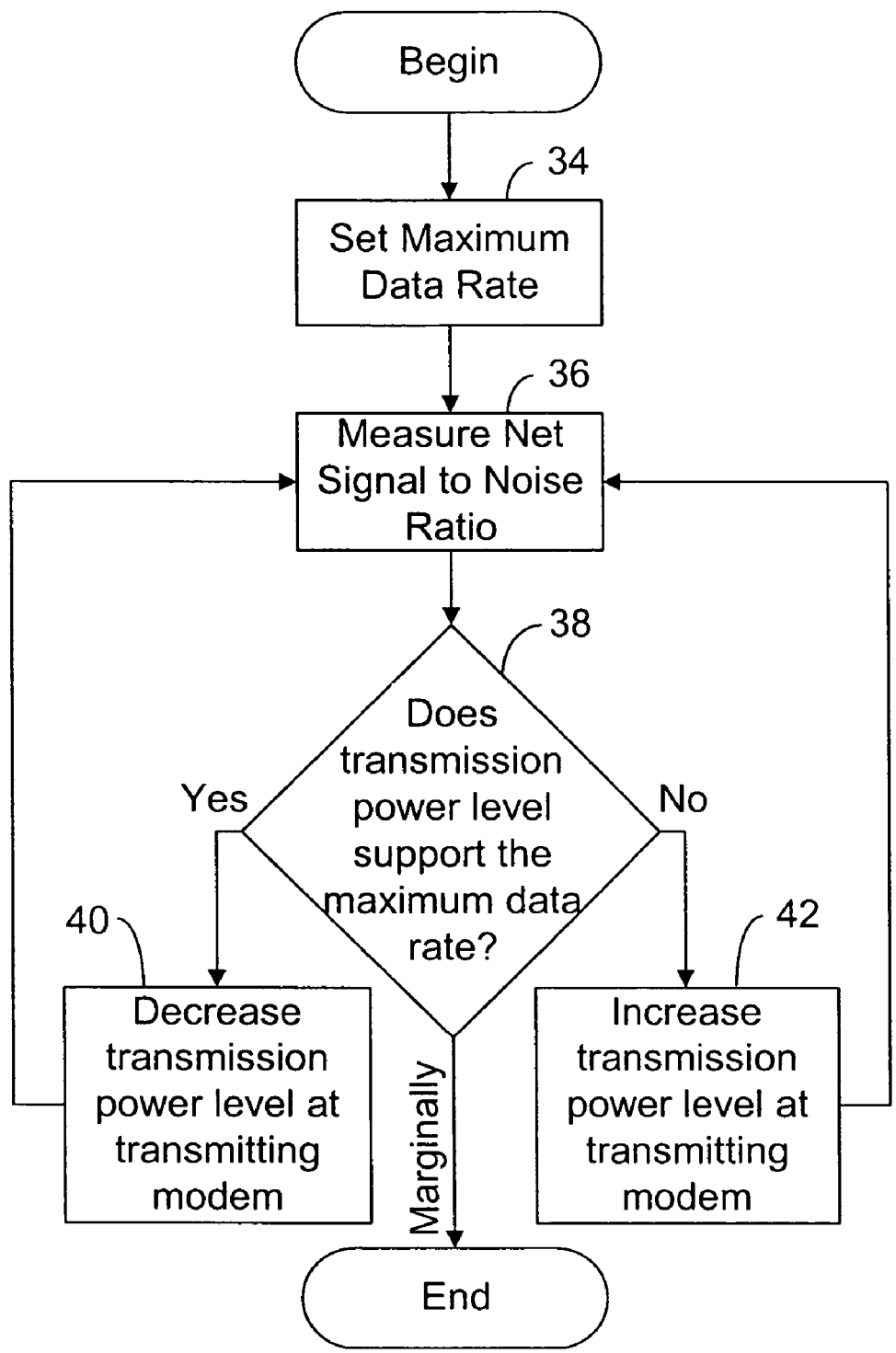
FIG. 3 is a transmit power level optimization flow chart for the xDSL performance customization system of FIG. 2.

With reference now to FIGS. 2 and 3, transmission power adaptation performed by various embodiments will be discussed. The communication system 10 of FIG. 2, comprising transmitting modem 12 and receiving modem 14, is used for simplicity. The principles discussed herein can readily be extended to a duplex environment. According to the xDSL communication system 10 depicted in FIG. 2, transmitting modem 12 comprises a central processing unit (CPU) 22 in communication with modulator 18, communication port 24 and memory 26. Memory 26 holds software control program 27 and database 29. Similarly, receiving modem 14 comprises CPU 28 in communication with demodulator 20 and memory 30. Memory 30, likewise holds software control program 31 and database 33. Demodulator 20 also comprises power measurement component 32. Control programs 27 and 31, in conjunction with databases 29 and 33, are executed by CPUs 22 and 28 and provide the control logic for the processes to be discussed herein.

FIG. 3 provides a flow chart for an embodiment performing transmit power adaptation. The process begins with step 34 in which a maximum data rate is negotiated between transmitting modem 12 and receiving modem 14. This negotiation can be carried out in a variety of embodiments. For example, receiving modem 14 could maintain a table of possible data rates in database 33, one of which is retrieved by control program 31 and then transmitted to transmitting modem 12 as part of an initialization procedure. Similarly, control program 27 in transmitting modem 12 could select a data rate from a table stored in database 29 for transmission to receiving modem 14 as part of an initialization procedure. Regardless of which modem initiates the establishment of the maximum data rate, the two modems can exchange messages according to any desired protocol until a mutually agreed upon rate is arrived at.

Once a maximum data rate has been established, receiving modem 14 will determine the net S/N ratio. Again, this determination can be made using a variety of well known techniques. One common technique is for transmitting modem 12 to cease transmission for a specified period. During this silent period, power measurement component 32 reads the noise present on xDSL 16 and calculates the power spectral density (PSD) of the noise. Following the silent period, transmitting modem 12 transmits a test pattern of data at a default power level allowing power measurement component 32 to calculate the PSD of the modulated signal plus noise. The previously calculated noise component can then be subtracted from the combined noise plus signal measurement to compute the net S/N ratio.

In step 38, receiving modem 14 determines whether the previously calculated S/N ratio will support the data rate originally arrived at in step 34. In one embodiment, this process will involve control program 31 indexing a table stored in database 33 in which minimum S/N ratios are correlated with a list of possible data transmission rates and retrieving the minimum S/N ratio required for the current data rate. This table can be constructed using EQ. 2, which was set forth previously. It should be noted, however, that EQ. 2 provides a theoretical maximum in which only thermal or white noise is accounted for. In practice, due to impulse noise, crosstalk, attenuation and delay distortion, the maximum throughput that can actually be achieved will be less. Therefore, the data rates entered into the table should be reduced by a suitable amount to account for these additional factors.

Control program 31 then compares the calculated S/N ratio with the minimum required S/N ratio retrieved from database 33. If the calculated S/N ratio exceeds the minimum required S/N ratio by more than a specific margin, receiving modem 14 will send a message to transmitting modem 12 requesting that the transmission power be decreased in step 40. As part of this message, receiving modem 14 could request a specific transmit power value or, for simplicity, transmitting modem 12 could be instructed to simply drop down to the next lower value in a table of possible transmit power levels stored in database 29. If the calculated S/N ratio falls below the minimum required ratio by more than a specific margin, receiving modem 14 will send a message to transmitting modem 12 requesting that the transmission power be increased in step 42. Again, receiving modem 14 could request a specific transmit power value or, alternatively, transmitting modem 12 could simply move up to the next higher value in a table of possible transmit power levels. If transmitting modem is instructed to merely increment or decrement its transmit power to the next available level, the process will repeat itself in iterative fashion beginning with step 36 until the calculated S/N ratio falls within a predetermined range or margin about the minimum required ratio. This range or margin ensures that the two modems don't endlessly chase one another in trying to close in on a satisfactory power level to support a specific data rate. Alternatively, if transmitting modem 12 is provided with an absolute transmit power value from receiving modem 14, the process should complete after one iteration.

It will be appreciated by those skilled in the art that more advanced and precise techniques can be used by other embodiments to calculate the minimum transmit power level that will support a given data rate. For example, transmitting modem 12 could transmit a test data pattern at a starting power level which would then be verified by receiving modem 14 using any well known error detection technique. If the test pattern has fewer than a certain minimum threshold of bit errors, receiving modem 14 would instruct transmitting modem 12 to decrease the transmit power. Conversely, if the test pattern has more than the minimum threshold of bit errors, transmitting modem 12 would be instructed to increase the transmit power. Through successive iterations of this procedure, the transmit power should end up at the level that just supports the data rate.

Figure 4:
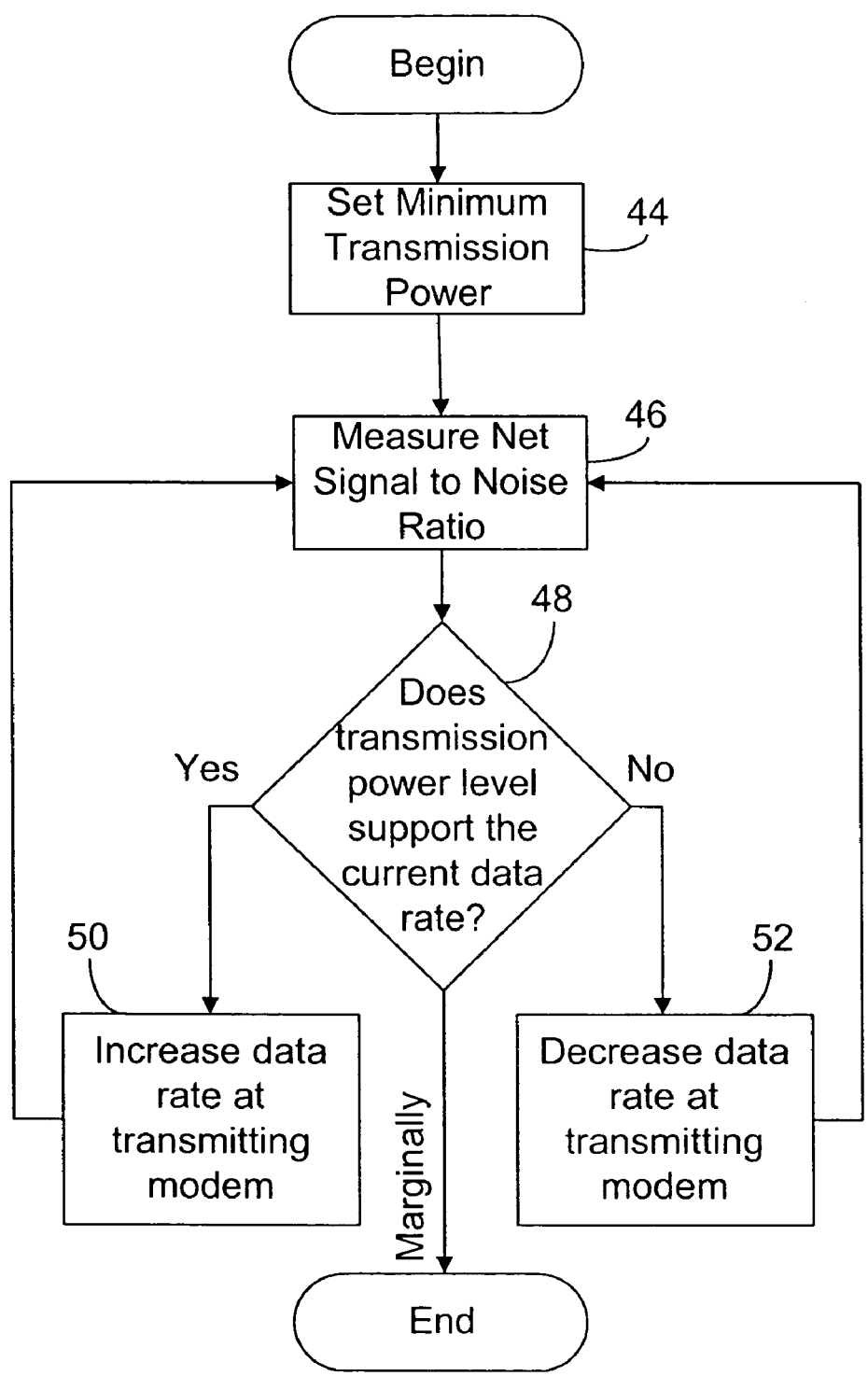
FIG. 4 is a data rate optimization flow chart for the xDSL performance customization system of FIG. 2.

The example of FIG. 3 is directed towards an embodiment for adapting or minimizing the transmission power level for a fixed data rate. Conversely, there will be circumstances, as discussed hereinbefore, where it is desirable for other embodiments to fix the transmission power level and then adapt or maximize the data rate for that power level. FIG. 4 provides a flow chart for data rate adaptation.

Referring now to FIGS. 2 and 4, the process begins with step 44 in which a minimum transmission power is negotiated between transmitting modem 12 and receiving modem 14. This negotiation can be carried out using the same approach discussed earlier with respect to data rate negotiation. That is, one or both of modems 12 and 14 could maintain tables in memories 26 and/or 30 that contain valid transmission power levels. One of the two modems 12 and 14 will propose a transmission power level to the other modem during an initialization procedure, and, using any desired protocol, the modems will exchange messages to arrive at an agreed upon minimum transmission power level.

Now that the minimum transmission power level has been established, receiving modem 14 will determine the net S/N ratio in step 46 in the same manner as discussed earlier with respect to step 36 of FIG. 3. During step 46, control program 27 in transmitting modem 12 will choose a default data rate, which is stored in database 29, for use as a starting point in the adaptation process. This initial data rate will then be transmitted to receiving modem 14 in a message.

In step 48, receiving modem 14 determines whether the calculated S/N ratio will support the initial data rate set by transmitting modem 12. Receiving modem 14 follows a similar procedure as that described earlier with respect to step 38 of FIG. 3. First, control program 31 uses the calculated S/N ratio to index the table stored in database 33 in which minimum S/N ratios are correlated with a list of possible data transmission rates and retrieves a maximum data rate. As part of the indexing procedure, control program 31 compares the calculated S/N ratio with the minimum required S/N ratio entries stored in database 33. When the calculated S/N ratio falls within a certain range or margin about a particular S/N ratio entry, the data rate associated with that entry will be retrieved. The margin or range value will be chosen based on the granularity of entries in the database to allow control program 31 to converge upon a choice. The margin or range is necessary because the calculated S/N ratio will rarely correspond exactly to a table entry.

Next, if the data rate retrieved from the table is greater than the initial data rate set by transmitting modem 12, receiving modem 14 could request in step 50 that transmitting modem 12 increase the data rate to the retrieved value or, alternatively, transmitting modem 12 could be instructed to simply increment the data rate to the next higher value in a table of possible data rates stored in database 29. On the other hand, if the data rate retrieved from the table is less than the initial data rate set by transmitting modem 12, receiving modem 14 could request in step 52 that transmitting modem 12 decrease the data rate to the retrieved value or, alternatively, transmitting modem 12 could be instructed to simply decrement the data rate to the next lower value in a table of possible data rates stored in database 29.

Similar to the case of transmit power adaptation, if transmitting modem 12 is instructed to merely increment or decrement the data rate to the next available level, the data rate adaptation process will repeat itself in iterative fashion beginning with step 48 until the transmitted data rate converges upon the rate retrieved from the table in database 33. Alternatively, if transmitting modem 12 is provided with an absolute data rate value from receiving modem 14, the process should complete after one iteration.

While various embodiments practice both the transmit power adaptation method of FIG. 3 and the data rate adaptation method of FIG. 4 using in-band messaging between the two modems (i.e., using xDSL data channel 54), in the preferred embodiment, embedded operational channel 56 (EOC) will be used. EOC 56 provides a low speed secondary channel on xDSL 16 that allows the aforementioned methods to be practiced simultaneously with ongoing data transmission. Instead of sending test data to calculate a S/N ratio at receiving modem 14, a S/N ratio can be calculated from a data transmission from an actual communication session.

Also, a typical application of the various embodiments will involve one of the two modems 12 and 14 being located at a central office (CO) or remote terminal (RT) site with the other modem being located at a customer site. This configuration allows the modem located at the CO, which, in FIG. 2, is transmitting modem 12, to be managed by network management system 58, external to the transmitting modem 12 as illustrated in FIG. 2. Through network management system 58, the tables that comprise databases 29 and 33 can be downloaded through communication port 24 and periodically updated according to the current xDSL application. The modem located at the customer site, which is receiving modem 14 in the present example, can download the tables it needs for database 33 from transmitting modem 12. Moreover, a technician can enter a particular performance parameter to be optimized (e.g., transmission power level or data throughput) and fix values for parameters that will not be optimized through network management system 58. Network management system 58 effectively eliminates negotiation steps 34 and 44 of FIGS. 3 and 4 respectively, in which the modems themselves select which performance parameters will receive fixed values and which performance parameter will be optimized. Accordingly, in one embodiment, the network management system 58 performs the selecting and fixing steps.

It will be appreciated by those skilled in the art that the functionality provided through control programs 27, 31 and databases 29, 33 can also be implemented through hardware (e.g., an application specific integrated circuit (ASIC) and supporting circuitry). Each implementation has its advantages, however. For example, hardware enjoys a speed and, arguably, a reliability advantage over software because hardware testing and verification methods are currently more advanced than software verification methods. On the other hand, software can be less expensive than customized hardware and offers greater flexibility in adding or modifying product features.

Further, other embodiments comprising control programs 27, 31 and databases 29, 33 can be embodied in any computer-readable medium for use by or in connection with a computer-related system (e.g., an embedded system such as a modem) or method. In this context of this document, a computer-readable medium is an electronic, magnetic, optical, semiconductor, or other physical device or means that can contain or store a computer program or data for use by or in connection with a computer-related system or method. Also, the computer program or data may be transferred to another computer-readable medium by any suitable process such as by scanning the computer-readable medium. Thus, the computer-readable medium could be paper or other suitable medium upon which the computer program can be printed, scanned with an optical scanner, and transferred into the computer's memory or storage.

Thus far, the principles of the present invention have been applied to a single pair of modems communicating in isolation. The advantages of the present invention, however, are perhaps most impressive when these principles are applied to a modem pool environment.

As discussed earlier, crosstalk is one of the primary sources of noise in a communication system. Moreover, crosstalk is particularly debilitating in a modem pool environment where many xDSL loops and other circuits are bundled together in the same cable binder, which is standard practice in a CO. While increasing signal transmission power can improve the S/N ratio in a communication system, it unfortunately comes with the negative side effect of enhancing crosstalk with a neighboring system.

Figure 5:
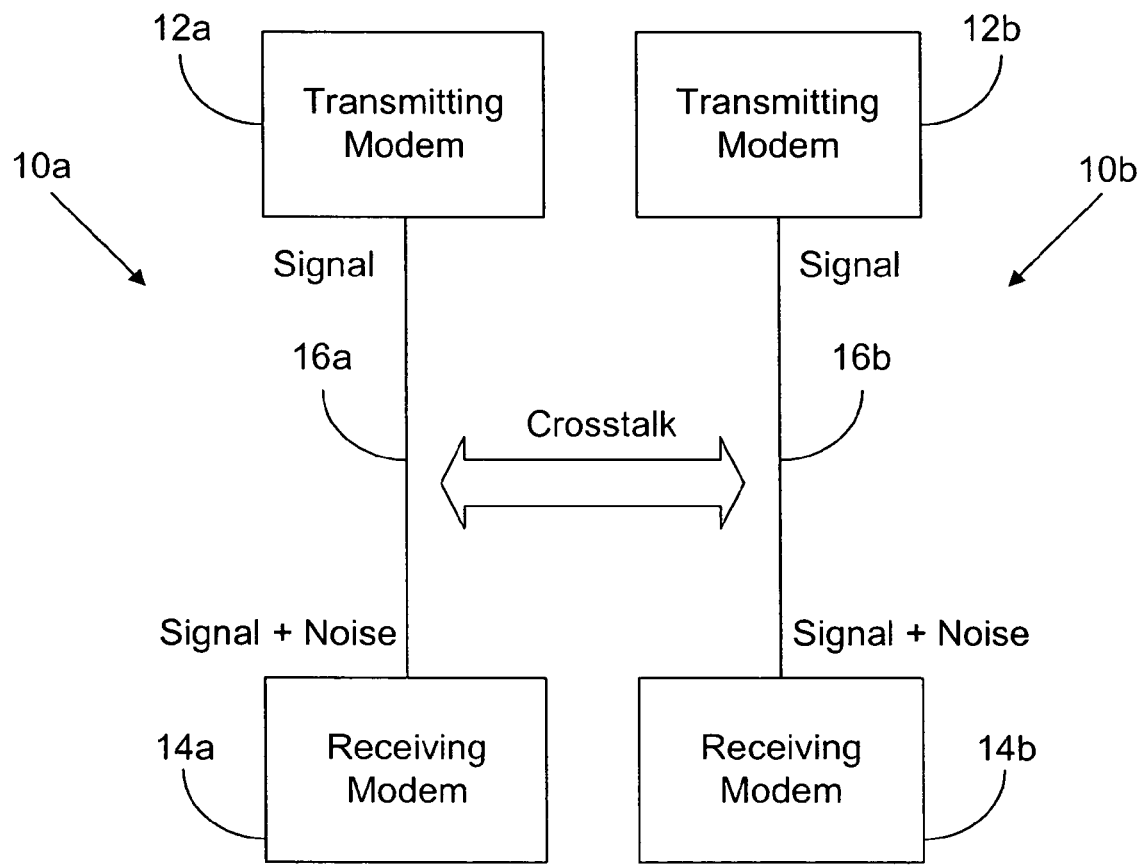
FIG. 5 is a block diagram illustrating the application of the xDSL performance customization system in an environment where multiple xDSL loops are bundled together.

Other embodiments optimize the performance of an entire modem pool system by reducing crosstalk stemming from unnecessary transmit power levels. Referring now to FIG. 5, a communication system is shown in which a first pair 10a of modems 12a and 14a communicating over xDSL 16a and a second pair 10b of modems 12b and 14b communicating over xDSL 16b suffer from crosstalk. The crosstalk results from xDSLs 16a and 16b being bundled together at one end in the same cable binder. Now, suppose transmitting modem 12a of first pair 10a is operating at a transmit power level that is greater than the minimum needed to support the current data rate. First pair 10a can then achieve a lower transmission power level using the process of FIG. 3 as described herein. The reduction in transmission power by first pair 10a has the effect of reducing the level of crosstalk noise that bleeds into second pair 10b. Therefore, second pair 10b can likewise negotiate a lower transmission power level because of the reduction in crosstalk even if second pair 10b was currently operating at an optimum performance level (i.e., the transmission power is marginally sufficient to support the current data rate). In theory, this process could go on in perpetuity with both pairs alternately negotiating transmit power level reductions; however, this would be possible only in a system where crosstalk is the only noise component. In all practical systems, there will always be non-crosstalk noise that will place a lower limit on transmission power levels. Nevertheless, in systems in which crosstalk is the dominating noise factor, the power savings can be dramatic.

In the example just described, second pair 10b, which was initially operating at a marginal performance level, reduced its transmission power while maintaining its current data rate or throughput in response to the transmission power reduction by first pair 10a. Alternatively, second pair 10b could opt instead to increase its data rate using the process of FIG. 4 as previously discussed. In that circumstance, the entire system will enjoy an overall performance improvement comprising both a reduction in power consumption and an increase in throughput. It should be noted that in a multiple xDSL system, such as a modem pool, at least one of the individual communication links (e.g., pairs in the preceding example) must be operating above its marginal performance level. That is, it must be using a transmission power level greater than the level necessary to support its current data rate. For systems comprising many communication pairs, a thorough performance improvement analysis would be highly complex and thus require a computer simulation. Nevertheless, it should be clear to the skilled practitioner that the performance of a large xDSL modem pool system can be tuned to attain a desired performance improvement through selective application of transmission power and data rate adaptation. Advantageously, network management system 58 can be used extensively by a technician to target those communication links that will benefit the most from power and/or data rate adaptation.

Note that through selective application of the xDSL performance customization principles discussed herein, the performance variance between xDSL communication pairs can be reduced. For example, recall the foregoing discussion with reference to FIG. 5 in which the second modem pair 10b had the option of undertaking a transmission power reduction or increasing its data rate in response to a transmit power reduction by the first modem pair 10a. Thus, assuming the first modem pair 10a was transmitting at a higher data rate than the second modem pair 10b, the throughput performance variance between the two pairs can be reduced by increasing the data rate of modem pair 10b.

The embodiments have been discussed as applied generally to an xDSL comprising a data channel 54 and an EOC 56 (see FIG. 2). The principles disclosed, however, can be extended in other embodiments to the lower level modulation techniques used in xDSL signaling. For example, rather than merely adapting transmission power uniformly across the entirety of the transmission spectrum, a frequency dependent embodiment can be implemented in which the same principles are applied to selected sub-bands within the spectrum. The concepts remain the same, except the receiver will now measure the net S/N ratio in each sub-band individually and negotiate the transmission power level and/or data rate within only that band of the xDSL data channel. This approach would be preferred for those xDSL systems using Discrete Multi-Tone (DMT) modulation in which the available bandwidth is divided into a set of independent, orthogonal sub-channels and then data is assigned to each sub-channel according to the channel quality. Similarly, embodiments can be applied to baseband systems by combining transmission power adaptation with precoding and adaptive pre-emphasis in which some parts of the signal are attenuated and other amplified according to frequency.

In the examples presented, two variables, transmission power level and data rate, were used as the optimization criteria. The embodiments are not limited to the optimization of these two variables, however. Loop length is another variable that can be optimized. It is well known that channel attenuation increases as a loop length increases. Thus, longer loop lengths will require a corresponding increase in transmission power level if the same data rate is to be maintained. The embodiments provide the skilled practitioner with the flexibility of weighing such performance factors as power consumption, throughput and loop length in an xDSL communication against one another to develop a customized system having a performance profile tailored to the needs of a particular customer base. As customer needs change, the performance of the system can easily be altered to accommodate any new requirements.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the claims, as set forth in the following claims.

What is claimed is:

1. A method of adjusting transmit performance parameters over a digital subscriber line (DSL), the method performed in a first DSL modem, the method comprising the steps of:
   negotiating, with a second DSL modem, a limiting value of a first performance parameter;
   receiving, from the second DSL modem, a signal exhibiting the first performance parameter, the received signal comprising a plurality of sub-bands, each sub-band transmitted at a respective transmit power level;
   determining a signal-to-noise-ratio for a sub-band of the received signal; and
   requesting, from the second DSL modem, an adjustment in a second performance parameter associated with the sub-band of the received signal, wherein the second performance parameter is different from the first performance parameter.

2. The method of claim 1, further comprising the step of:
   receiving, from the second DSL modem, a second signal exhibiting the first performance parameter and the adjustment in the second performance parameter.

3. The method of claim 1, wherein the second performance parameter is transmit power level.

4. The method of claim 1, wherein the second performance parameter is transmit data rate.

5. The method of claim 1, wherein said negotiating step is performed after the receiving step and before the determining step.

6. The method of claim 5, wherein said second performance parameter is transmit data rate and said first performance parameter is transmit power level.

7. The method of claim 5, wherein said second performance parameter is transmit power level and said first performance parameter is transmit data rate.

8. The method of claim 1, further comprising the step of:
   selecting the second performance parameter from a plurality of possible performance parameters.

9. The method of claim 1, further comprising the step of:
   repeating the receiving, determining and requesting steps until the first performance parameter of the received signal is marginally supported.

10. The method of claim 1, further comprising the step of:
    repeating, using the negotiated value for the first performance parameter, the receiving, determining and requesting steps until the received signal marginally supports the adjustment to the second performance parameter.

11. The method of claim 1, wherein receiving the signal is over a primary channel and requesting the adjustment is over a secondary channel.

12. The method of claim 1, wherein the limiting value of the first performance parameter is a minimum value.

13. The method of claim 2, further comprising the step of:
receiving, from the second DSL modem, a second signal exhibiting the first performance parameter and the adjustment in the second performance parameter associated with the sub-band of the received signal.

14. A receiving digital subscriber line (DSL) modem comprising:
means for receiving, from a transmitting DSL modem, a signal exhibiting a first performance parameter;
means for negotiating, with the transmitting DSL modem, a value for the first performance parameter;
means for determining a signal-to-noise-ratio for the received signal; and
means for requesting, from the transmitting DSL modem, an adjustment in a second performance parameter associated with the received signal based at least in part upon the signal-to-noise-ratio, wherein the second performance parameter is transmit data rate, and wherein the second performance parameter is different from the first performance parameter.

15. The receiving DSL modem of claim 14, wherein said first performance parameter is transmit power level.

16. The receiving DSL modem of claim 14, further comprising:
means for selecting the second performance parameter from a plurality of possible performance parameters.

17. The receiving DSL modem of claim 14, wherein:
the received signal comprises a plurality of sub-bands, each sub-band transmitted at a transmit power level; and
the means for determining the signal-to-noise-ratio for the received signal comprises means for determining a signal-to-noise-ratio for a sub-band in the received signal.

18. The receiving DSL modem of claim 17, where in the means for requesting comprises means for requesting an adjustment in the second performance parameter associated with the sub-band of the received signal.

19. The receiving DSL modem of claim 18, further comprising:
means for receiving, from the transmitting DSL modem, a second signal exhibiting the first performance parameter and the adjustment in the second performance parameter associated with the sub-band of the received signal.

20. The receiving DSL modem of claim 14, wherein the value for the first performance parameter is a limiting value.

21. The receiving DSL modem of claim 20, wherein the limiting value for the first performance parameter is a maximum value.

22. The receiving DSL modem of claim 14, wherein the signal is received over a primary channel and the adjustment is requested over a secondary channel.

23. A system for adjusting transmit performance parameters over a digital subscriber line (DSL) comprising:
means for negotiating, with a DSL modem, a maximum value for a first performance parameter;
means for receiving, from the DSL modem, a signal exhibiting the first performance parameter, the signal comprising a plurality of sub-bands, each sub-band transmitted at a respective transmit power level;
means for determining a signal-to-noise-ratio for the received signal; and
means for requesting, from the DSL modem, an adjustment in a second performance parameter associated with the received signal based at least in part upon the signal-to-noise-ratio, wherein the second performance parameter is different from the first performance parameter.

24. The system of claim 23, wherein the means for determining comprises means for determining a signal-to-noise-ratio for a sub-band of the received signal.

25. The system of claim 24, wherein the means for requesting comprises means for requesting an adjustment in the second performance parameter associated with the sub-band of the received signal.

26. The system of claim 25, further comprising:
means for receiving, from the DSL modem, a second signal exhibiting the first performance parameter and the adjustment in the second performance parameter associated with the sub-band of the received signal.

27. The system of claim 23, wherein the signal is received over a primary channel and the adjustment is requested over a secondary channel.

28. A method of adjusting transmit performance parameters over a digital subscriber line (DSL), the method performed in a first DSL modem, the method comprising the steps of:
negotiating, with a second DSL modem, a maximum value for a first performance parameter;
receiving, from the second DSL modem, a signal exhibiting the first performance parameter, wherein the received signal comprises a plurality of sub-bands, each sub-band transmitted at a respective transmit power level;
determining a signal-to-noise-ratio for the received signal; and
requesting, from the second DSL modem, an adjustment in a second performance parameter associated with the received signal based at least in part upon the signal-to-noise-ratio, wherein the second performance parameter is different from the first performance parameter.

29. The method of claim 28, wherein the determining step comprises determining a signal-to-noise-ratio for a sub-band of the received signal.

30. The method of claim 29, wherein the requesting step comprises requesting an adjustment in the second performance parameter associated with the sub-band of the received signal.

31. The method of claim 28, further comprising the step of:
repeating the receiving, determining and requesting steps until the first performance parameter of the received signal is marginally supported.

32. The method of claim 28, further comprising the step of:
repeating, using the negotiated value for the first performance parameter, the receiving, determining and requesting steps until the received signal marginally supports the adjustment to the second performance parameter.

33. The method of claim 28, wherein the second performance parameter is transmit data rate.

34. The method of claim 28, wherein the second performance parameter is transmit power level.

35. The method of claim 28, wherein said negotiating step is performed after the receiving step and before the determining step.

36. The method of claim 35, wherein said second performance parameter is transmit data rate and said first performance parameter is transmit power level.

37. The method of claim 35, wherein said second performance parameter is transmit power level and said first performance parameter is transmit data rate.

38. The method of claim 28, further comprising the step of:
selecting the second performance parameter from a plurality of possible performance parameters.

39. The method of claim 28, wherein the signal is received over a primary channel and the adjustment is requested over a secondary channel.

40. A receiving digital subscriber line (DSL) modem comprising:
a demodulator in communication with a transmitting DSL modem;
a memory;
a central processing unit (CPU) in communication with the demodulator and the memory; and
a control program stored in the memory, the control program configured to, when executed by the CPU:
negotiate, with the transmitting DSL modem, a limiting value of a first performance parameter;
determine a signal-to-noise-ratio for a signal received from the transmitting DSL modem, the signal exhibiting the first performance parameter; and
request, from the transmitting DSL modem, an adjustment in a second performance parameter associated with the received signal based at least in part upon the signal-to-noise-ratio, wherein the second performance parameter is transmit data rate, wherein the second performance parameter is different from the first performance parameter.

41. The receiving DSL modem of claim 40, wherein the control program is further configured to select the second performance parameter from a plurality of possible performance parameters.

42. The receiving DSL modem of claim 40, wherein the control program is further configured to determine a signal-to-noise-ratio for a sub-band in the received signal, wherein the sub-band is transmitted at an associated transmit power level.

43. The receiving DSL modem of claim 42, wherein the control program is further configured to request, from the transmitting DSL modem, an adjustment in the second performance parameter associated with the sub-band of the received signal.

44. The receiving DSL modem of claim 40, wherein the control program is further configured to:
receive, from the transmitting DSL modem, a second signal exhibiting the first performance parameter and the adjustment in the second performance parameter.

45. The receiving DSL modem of claim 40, wherein said first performance parameter is transmit power level.

46. The receiving DSL modem of claim 40, wherein the control program is further configured to repeat determining a signal-to-noise-ratio and requesting an adjustment until the first performance parameter of the received signal is marginally supported.

47. The receiving DSL modem of claim 40, wherein the control program is further configured to repeat, using the negotiated limiting value for the first performance parameter, determining a signal-to-noise-ratio and requesting an adjustment until the received signal marginally supports the adjustment to the second performance parameter.

48. The receiving DSL modem of claim 40, wherein the signal is received over a primary channel and the adjustment is requested over a secondary channel.

49. A method of adjusting transmit performance parameters over a digital subscriber line (DSL), the method performed in a first DSL modem, the method comprising the steps of:
negotiating, with a second DSL modem, a value for a first performance parameter;
receiving, from the second DSL modem, a signal exhibiting the first performance parameter;
determining a signal-to-noise-ratio for the received signal; and
requesting, from the second DSL modem, an adjustment in a second performance parameter associated with the received signal based at least in part upon the signal-to-noise-ratio, wherein the second performance parameter is transmit data rate, and wherein the second performance parameter is different from the first performance parameter.

50. The method of claim 49, further comprising the step of:
receiving, from the second DSL modem, a second signal exhibiting the first performance parameter and the adjustment in the second performance parameter.

51. The method of claim 49, wherein said negotiating step is performed after the receiving step and before the determining step.

52. The method of claim 51, wherein said first performance parameter is transmit power level.

53. The method of claim 49, further comprising the step of:
repeating the receiving, determining and requesting steps until the first performance parameter of the received signal is marginally supported.

54. The method of claim 49, further comprising the step of:
repeating, using the negotiated value for the first performance parameter, the receiving, determining and requesting steps until the received signal marginally supports the adjustment to the second performance parameter.

55. The method of claim 49, wherein the received signal comprises a plurality of sub-bands, each sub-band transmitted at a transmit power level.

56. The method of claim 55, wherein the determining step comprises determining a signal-to-noise-ratio for a sub-band of the received signal.

57. The method of claim 56, wherein the requesting step comprises requesting an adjustment in the second performance parameter associated with the sub-band of the received signal.

58. The method of claim 49, wherein receiving the signal is over a primary channel and requesting the adjustment is over a secondary channel.

* * * * *